Sept. 2, 1947.  H. BAADE  2,426,722
TRANSMISSION OPERATING MECHANISM
Filed July 22, 1942  4 Sheets-Sheet 1

INVENTOR
HENRY BAADE
BY H. O. Clayton
ATTORNEY

Sept. 2, 1947.  H. BAADE  2,426,722

TRANSMISSION OPERATING MECHANISM

Filed July 22, 1942  4 Sheets-Sheet 2

INVENTOR
HENRY BAADE
BY H. O. Clayton
ATTORNEY

Sept. 2, 1947. H. BAADE 2,426,722
TRANSMISSION OPERATING MECHANISM
Filed July 22, 1942 4 Sheets-Sheet 4

INVENTOR
HENRY BAADE
BY H. O. Clayton
ATTORNEY

Patented Sept. 2, 1947

2,426,722

UNITED STATES PATENT OFFICE 2,426,722

TRANSMISSION OPERATING MECHANISM

Henry Baade, South Bend, Ind., assignor to Bendix Aviation Corporation, South Bend, Ind., a corporation of Delaware Application July 22, 1942, Serial No. 451,849

12 Claims. (Cl. 74—335)

This invention relates to transmission operating means and particularly to means for operating two separate change-speed transmissions constituting part of the power plant of a self-propelled vehicle.

The principal object of my invention is to provide a manually and power operated mechanism for actuating two separate change-speed transmissions, said transmissions constituting a part of the power plant of an armored military vehicle having a plurality of engines and a plurality of driven wheels.

A further object of my invention is to provide a simple and compact mechanism of relatively few moving parts for simultaneously operating one or the other of two separate change-speed transmissions of an armored car or a vehicle such as a truck or bus.

Yet another object of my invention is to provide a mechanism for operating one or the other or both of two separate change-speed transmissions of a self-propelled vehicle, said mechanism including manually operated means for selecting the particular transmission to be operated or for so operating the mechanism as to make possible the simultaneous operation of both transmissions and said mechanism further including manually and power operated means operative to first select a certain operation of the transmission or transmissions and then establish said transmission or transmissions in the desired gear ratio setting.

A further object of my invention is to so construct this transmission operating mechanism as to prevent the aforementioned transmission selecting operation of the mechanism when one or the other or both of the transmissions is or are established in gear.

A further object of my invention is to provide a manually controlled power and manually operated transmission operating mechanism for operating two separate change-speed transmissions each having a plurality of shift rails, said mechanism being manually operated to select the operation of one or the other or both of said transmissions, manually operated to effect a shift rail selecting operation of the mechanism and power and manually operated to establish the desired gear ratio setting operation of the mechanism, said latter operation being such that the operator is conscious of the degree of force being exerted by a pressure differential operated motor constituting a part of the mechanism.

Yet another object of my invention is to provide a mechanism for operating one or the other or both of two change-speed transmissions constituting a part of the power plant of a self-propelled vehicle, said mechanism including a pressure differential operated motor for in part operating one or the other or both of said transmissions, a manually operated selector lever and force transmitting means interconnecting the selector lever, the power element of the motor and the selected transmission or both transmissions, the parts of said force transmitting means being so constructed and arranged as to make possible a follow-up control of the motor.

Yet another object of my invention is to provide, in a self-propelled vehicle having two separate power plants, each comprising an internal combustion engine and a change-speed transmission, mechanism for operating one or the other or both of said transmissions comprising two bodily movable and rotatable shafts spaced apart and extending parallel to each other lengthwise of the vehicle and means for operating one or the other or both of said shafts consisting of a manually operable transmission selecting lever, a manually operable shift rail selecting and gear establishing selector lever, a pressure differential operated motor which houses its control valve mechanism and force transmitting means interconnecting the power element of the motor, the control valve mechanism, the selector levers and the transmission operating shafts.

A further object of the invention is to so construct said force transmitting means that the same includes a bodily movable key means for effecting a transmission selecting operation of the mechanism and force transmitting linkage so constructed and so operative that the driver is at all times, during the operation of the motor, conscious of the degree of transmission operating force being exerted by said motor, said force transmitting linkage also effecting a follow-up control of the valve mechanism, a partial manual operation of one or the other or both of the transmissions concurrently with a power operation thereof and a complete manual operation of one or the other or both of said transmissions in the event of failure of the power means.

Other objects of the invention and desirable details of construction and combinations of parts will become apparent from the following description of a preferred embodiment, which description is taken in conjunction with the accompanying drawings, in which.

Figure 1:
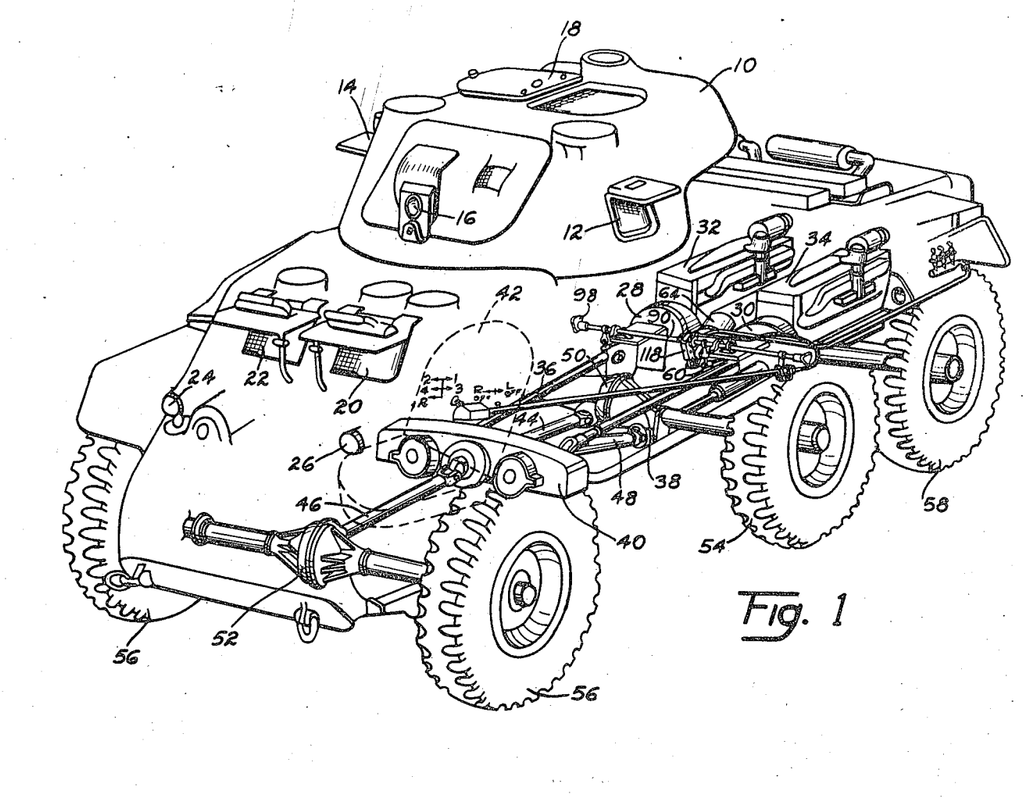
Figure 1 discloses an armored car having incorporated, in the power plant thereof, the transmission operating mechanism constituting my invention.

There is disclosed in Figure 1 an armored car including the transmission operating means constituting my invention. It is to be noted, however, that the mechanism constituting my invention is not limited in its usage to such a military vehicle, for the same may be employed to operate any self-propelled vehicle including in its power plant two separate change-speed transmissions each operated by a bodily movable and rotatable rod, said rods extending parallel with each other.

Referring now to Figure 1 disclosing a preferred embodiment of my invention the armored car includes a turret-like housing 10 provided with machine gun openings 12 and 14, an opening 16 receiving the muzzle of a larger gun or cannon and a trap door 18. Openings 20 and 22 receive the muzzles of other guns and headlights 24 and 26 also constitute parts of the car which is merely sketchily disclosed in Figure 1.

My invention constitutes a part of the power plants of the armored car disclosed in Figure 1 and particularly the means for operating the four speeds forward and reverse change-speed transmissions 28 and 30 which, together with friction clutches or fluid clutches or both, constitute a part of the means interconnecting internal combustion engines 32 and 34 with propeller shafts 36 and 38 respectively. The latter shafts extend into a transfer case 40, that is a selective transmission mechanism, said mechanism being manually operated by a force transmitting linkage, not shown, including a selector mounted within easy reach of the driver of the car who is seated upon a seat 42. From the transfer case 40 there extend propeller shafts 44, 46 and 48 drivably connected respectively with differential mechanisms 50, 52 and a differential mechanism, not shown, said three mechanisms being drivably connected by axles to three separate sets of drive wheels 54, 56 and 58 respectively.

At this juncture it is to be noted that applicant makes no claim to any feature of the armored car or its power plant as above described, for applicant's invention is limited solely to means for operating and controlling the change-speed transmissions 28 and 30.

Figure 2:
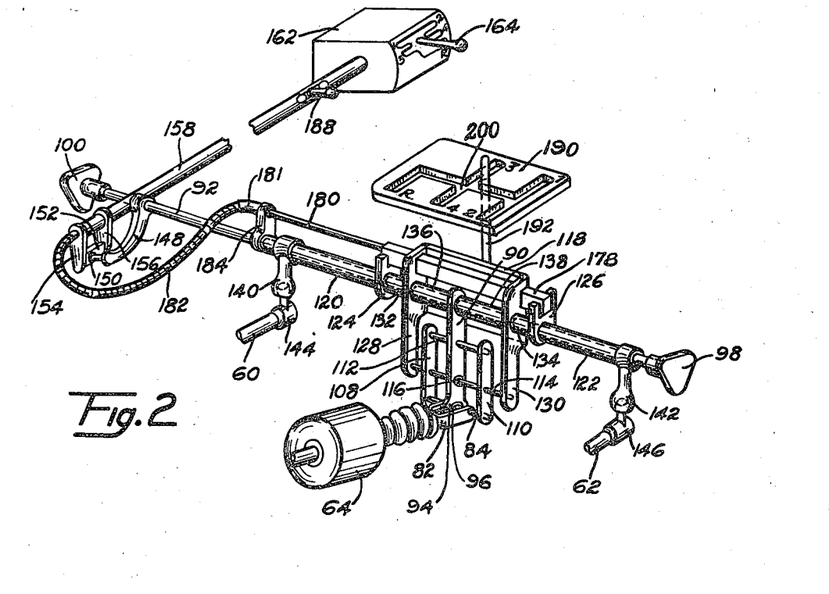
Figure 2 is a view disclosing, in perspective, the transmission operating mechanism of my invention.

Describing now the construction of this transmission operating and controlling mechanism which is disclosed somewhat diagrammatically in Figure 2 there are provided two spaced apart parallel shafts 60 and 62 connected respectively with the four speeds forward and reverse selective gear transmissions 30 and 28. It is to be understood, however, that my invention is not necessarily limited to means for operating two four speeds forward and reverse transmissions.

Figure 3:
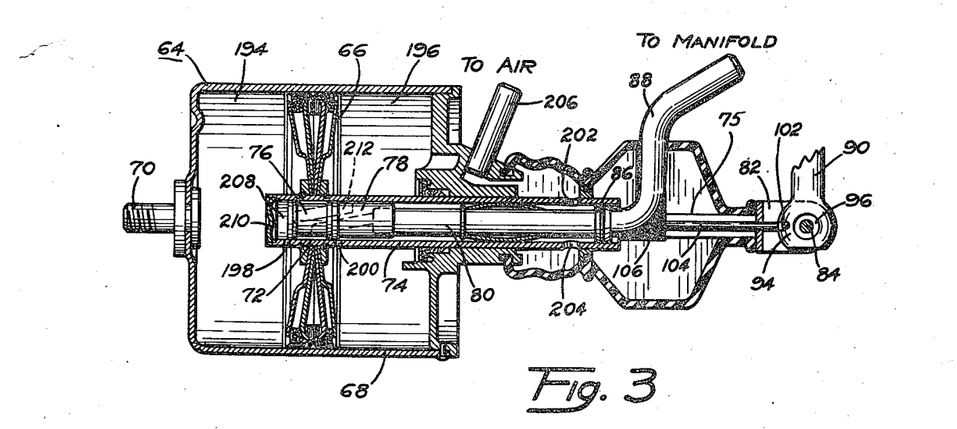
Figure 3 is a sectional view disclosing in detail the transmission operating motor of my invention.

The most important unit of the power means for operating the transmissions 28 and 30 is the double ended double acting air suspended vacuum operated motor 64 disclosed in Figure 3 and this unit includes a piston or power element 66 and a casing 68 preferably universally secured, by means including a stud 70, to the vehicle chassis. The motor is operative when energized to bodily move one or the other or both of the shafts 60 and 62 to establish the one or the other or both of the transmissions 28 and 30 in gear. As will be described more fully hereinafter the force exerted by the piston 66 in effecting this operation is in addition to that exerted by the physical effort of the driver and the degree of this force is directly proportional to the effort exerted by the piston.

The motor 64 is controlled by valve means housed within the motor and comprises two relatively movable valve members. One of these valve members, indicated by the reference numeral 72, constitutes the end portion of a hollow connecting rod 74 and the remaining valve member, indicated by the reference numeral 76, is a spool-shaped member having a sleeve portion 78 tightly fitting over one end of a hollow valve operating rod 80 extending within the connecting rod 76. To the outer end of the rod 74 there is fixedly secured two spaced straps 75; and to the outer end of said straps there is fixedly secured a U-shaped member 82 having aligned openings in its ends to receive a pin 84. Only one of the straps 75 is disclosed in Figure 3 and between said straps there extends a pin 104 which is referred to hereinafter. To the outer end of the valve operating rod 80 there is secured at 86 a bent tube 88 to which a conduit is secured, not shown, leading to one or both of the intake manifolds of the engines 32 and 34.

A crank 90, Figure 2, fixedly secured at one of its ends to a cross shaft 92, preferably extends downwardly and is provided at its lower end with an enlarged portion 94 having a relatively large opening 96 therein to receive therethrough the aforementioned pin 84. The cross shaft is bodily movable lengthwise and is supported by brackets 98 and 100 secured to the chassis or any unit fixed thereto, said brackets having sockets therein to receive the ends of the shaft, said sockets being deep enough to permit the endwise movement of said shaft. Through the enlarged portion 94 of the crank 90 there extends a bent end portion 102 of the relatively short pin 104 preferably welded or otherwise permanently secured at 106 to the tube 88. As disclosed in Figure 2 idler lever members 108 and 110 are mounted one on each side of the crank 90, the supports for said lever members consisting of the pin 84, a pin 112 extending through the crank 90 and a pin 114 extending through a relatively large opening 116 in the crank 90. The pin 114 extends through the idler lever members and into the lower ends of a U-shaped two-armed lever member 118 rotatably mounted on the cross shaft 92. Sleeve members 120 and 122 are rotatably mounted on the cross shaft 92 and to adjacent ends of these members are fixedly secured U-shaped members 124 and 126 also rotatable on said shaft and having openings therein through which the cross shaft extends. The U-shaped members 124 and 126 are spaced from arms 128 and 130 of the lever member 118 by means of spacer members 132 and 134 rotatably mounted on the shaft 92 and spacer members 136 and 138 are interposed between said arms and the crank 90. To the outer ends of the sleeve members 120 and 122 there are fixedly secured downwardly extending cranks 140 and 142 respectively which are universally connected, preferably by ball and socket joints 144 and 146, to the ends of the transmission operating shafts 60 and 62.

Figures 7, 8, 10:
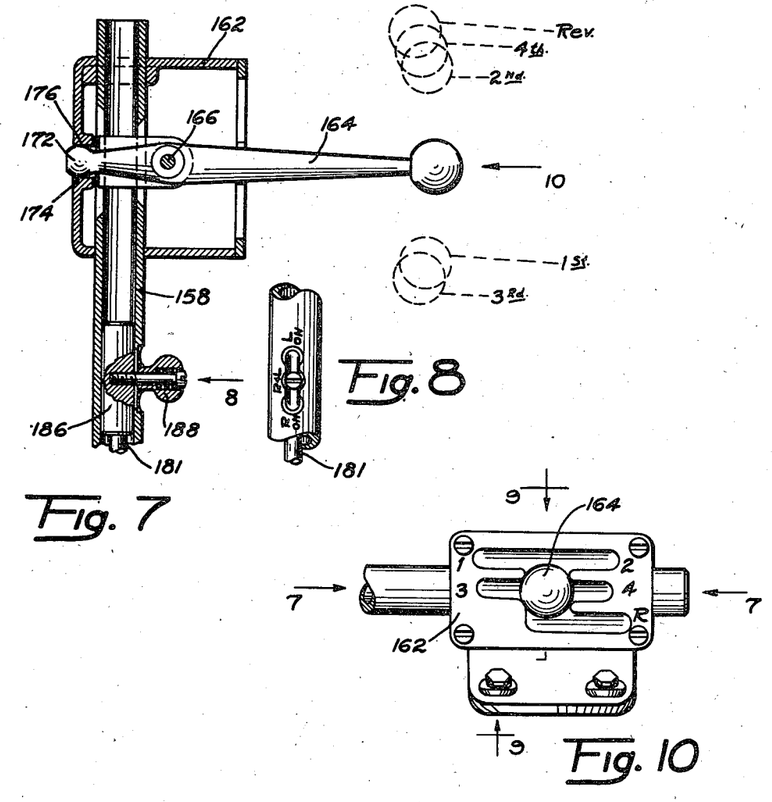
Figure 7 is a sectional view, taken on the line 7—7 of Figure 10, disclosing details of the transmission controlling selector lever and the housing therefor.
Figure 8 is a view disclosing the lever operable to select the transmission to be operated.
Figure 10 is a top plan view of the housing for the transmission controlling selector lever.
Figure 9:
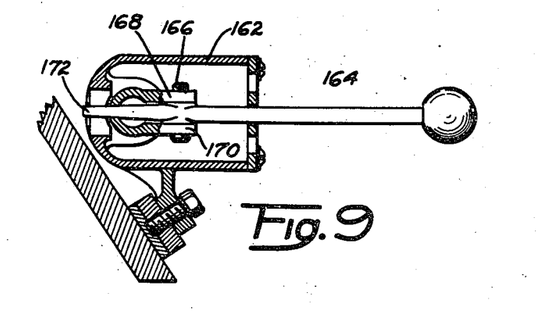
Figure 9 is a sectional view, taken on the line 9—9 of Figure 10, disclosing certain details of the housing for the transmission controlling selector lever.

To one end of the cross shaft 92 there is fixedly secured a curved crank 148 which extends downwardly and outwardly and to its end there is secured a ball fitted within a socket in a block 152 which is secured at its ends to the lower ends of cranks 154 and 156 fixedly secured to a hollow rod 158. This ball and socket joint is indicated by the reference numeral 150. The rod is supported in part by a bracket, not shown, secured to the chassis of the vehicle and extends at its outer end into a housing 162 secured in place adjacent the driver's seat 42. The top of the housing or box-like member 162 is provided with the irregular shaped opening disclosed in Figures 2 and 10 to provide means for guiding the movement of a selector lever 164 as the same is moved to first effect a shift rail or cross shift selecting operation of one or the other or both of the transmissions 28 and 30 and then effect a meshing of the gears of either one or both of said transmissions to establish the same in gear. The selector lever 164, as disclosed in Figures 7 and 9, is pivotally mounted upon a pin 166 extending therethrough and said pin extends through openings in the ends of arm members 168 and 170 which extend from the end of the rod 158 lying within the housing member 162. The end 172 of the lever member 164 is enlarged as disclosed in Figure 7 and fits within a rectangular shaped opening in the base of the housing member. Lateral movement of the lever 164 to effect a shift rail selecting operation of a transmission or both transmissions results in a rotation of the rod 158 about its longitudinal axis, the end 172 of the lever moving across the rectangular opening in the housing. The movement of the lever 164 in a plane extending through the axis of the rod 158 results in a bodily movement of the rod 158, the end 172 of the lever fulcruming either at 174 or 176 of Figure 7. The rod 158 is cut away as disclosed in Figure 7 to make possible the movement of the lever and the rod.

The means for effecting the transmission selecting operation of the mechanism constituting my invention preferably comprises a rectangular shaped key member 178, Figure 2, which extends through openings in the arms 128 and 130 of lever 118 and at its ends fits within the slots provided by the U-shaped members 124 and 126. When the key member 178 is in the position disclosed in Figure 2 it registers with both of the U-shaped members to thereby render the mechanism operative to operate both of the transmissions 28 and 30. To disengage the key member from one or the other of the U-shaped members, to thereby adjust the mechanism for an operation of but one of the two transmissions, there is provided a rod 180 secured at one of its ends to the key member 178 and at its other end to the cable 181 of a Bowden control 182, one end of the conduit of which is secured to a support 184 mounted on the shaft 92 and at its other end to the crank 154 at the end of the rod 158. The cable extends through the rod 158 and at its end is preferably provided with a cylinder 186 slidably fitted within said rod. A knob 188 secured to the member 186 is provided as a means for manually moving the cable and the key member 178 connected thereto, to register said member with one or the other or both of the U-shaped members 124 and 126.

Completing the description of the most important elements of the mechanism constituting my invention a plate 190, fixedly secured to the chassis or some part secured thereto, is provided with the irregular shaped opening disclosed in Figure 2 to receive the end of a rod 192 secured at one of its ends to the lever member 118.

Describing now the operation of the transmission operating mechanism constituting my invention, and incidentally completing the description of certain details thereof, it will be assumed that both engines 32 and 34 are idling, thereby making of their intake manifolds a source of vacuum to operate the motor 64. It will also be assumed that both of the transmissions and the motor are in their transmission neutral position and that the key member 178 is in the position disclosed in Figure 2, that is the position to render the mechanism of my invention operative to operate both of the transmissions.

When the air suspended motor 64 is in its transmission neutral position the piston 66 and valve members 72 and 76 are in the positions disclosed in Figure 3, that is compartments 194 and 196 of the motor are vented to the atmosphere via ports 198 and 200 in the valve member 72. The port 200 then interconnects the compartment 196 with the interior of the rod 74 which is vented to the atmosphere via ports 202 and 204 and a nipple 206 and the port 198 interconnects the compartment 194 with a compartment 208 outlined by a plug 210 in the end of the connecting rod 74 and the end face of the valve member 76. The latter compartment is at all times vented to the atmosphere via a duct 212 in the valve member 76, the interior of the rod 74, ports 202 and 214 and the nipple 206.

To place the transmissions of the armored car in first gear the driver first rotates the selector lever 164 laterally until it lies in a groove marked 1 and 2, Figure 10, and the driver then moves said lever to the position marked 1 in said figure. By so operating the mechanism the rod 158 is first rotated counterclockwise about its axis, thereby rotating the cranks 154 and 156 in a counterclockwise direction. The crank 148 is thus bodily moved to the right, Figure 2, to bodily move as a unit the cross shaft 92 and all of the force transmitting links, levers, spacers, cranks, etc., mounted on said shaft. The cranks 140 and 142 are thus bodily moved to the right thereby effecting a clockwise rotation of the shafts 60 and 62 about their longitudinal axis. This operation of the shafts results in what is known in the art as a cross shift or shift rail selecting operation of the transmissions, that is the first and second gear shift rail or their equivalent of the transmissions are selected for operation. As stated above, the shaft 92 and all of the mechanism mounted thereon moves as a unit in effecting this cross shift operation and the cylinder 68 moves angularly upon its universal mounting.

Figure 6:
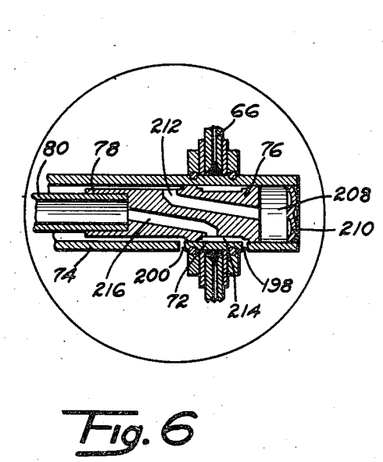
Figure 6 is a view similar to Figure 4, disclosing the parts of the valve in position to effect one of the shift rail moving operations of the motor.

After the above described shift rail selecting operation is completed by lateral movement of the lever 164 the rearward movement of said lever effects the first gear setting of the transmissions. In the latter operation of the lever 164 the same fulcrums at 176 thereby bodily moving the rod 158. This movement of the rod serves to move the block 152 and through the intermediary of the ball and socket joint 150 serves to rotate the crank 148 and shaft 92 clockwise. The crank 90 is also rotated clockwise and this movement of said crank results in a counterclockwise rotation of the idler levers 108 and 110 about the pin 114 which is at the time stationary by virtue of the resistance to movement offered by the transmission mechanism. The clockwise rotation of the crank 90 and the counterclockwise rotation of the levers 108 and 110 serve to simultaneously move in opposite directions both parts 72 and 76 of the valve to crack, that is open, the same, the openings 96 and 116 in the crank 90, which are larger in diameter than the diameter of the pins 94 and 114 respectively, making possible this movement of the valve 76 and idler levers. The valve members are then positioned as disclosed in Figure 6, that is the motor compartment 194 is connected to the intake manifolds of the engines 32 and 34 or any other convenient source of vacuum via port 198, a recess 214 outlined by the grooved portion of the spool-shaped valve member 76 and the inner wall of the valve member 72 and a duct 216 interconnecting said recess and the interior of the hollow valve operating rod 80. As previously described this rod is connected to the source of vacuum by a tube 88 and a conduit or conduits, not shown. The motor compartment 196 is then vented to the atmosphere via the port 200 and the interior of the rod 74 which is vented to the atmosphere as previously described. The compartment 194 being then partially evacuated and the compartment 196 being at atmospheric pressure it follows that the piston 66 is subjected to a differential of pressures resulting in the piston, and the force transmitting means connected thereto, being moved to the left, Figure 2, to establish the transmissions in first gear.

Describing the first gear operation of the mechanism in greater detail, when the piston 66 moves toward its low gear position, that is to the left, Figure 2, the idler or what may also be termed reaction levers 128 and 130 tend to rotate clockwise thereby exerting a load upon the pin 112 which would result in a clockwise rotation of the two arms of the U-shaped lever member 118 if the movement of the crank 90 were stopped. It follows therefore that if the crank 90 is kept in motion after the valve is cracked then all of the valve operating members disclosed in Figure 2 move as a unit in a clockwise direction; and this operation results, through the intermediary of the key member 178, in a clockwise rotation of the U-shaped members 124 and 126 and the cranks 140 and 142 connected thereto. The shafts 60 and 62 are thus bodily moved to the left, Figure 2, to establish the transmissions in first gear.

In the above described operation it is assumed that the driver keeps the selector lever 164 in motion until the transmissions are established in first gear; for if said lever were not kept in motion then the valve mechanism, by virtue of the immobility of the valve member 76 and the continued movement of the valve member 72 would operate to lap the valve, all as will be described hereinafter. The lapping of the valve would then stop the movement of the piston 66 short of its first gear position.

It is assumed now that during the aforementioned movement of the rods 60 and 62 to establish the transmission in first gear the operation of the synchronizer of each transmission is initiated and when this occurs the rods 60 and 62 come to an abrupt stop. The motor 64 being energized at the time by virtue of the valve 72, 76 being opened it follows that the force exerted by the piston 66 will progressively increase in inverse proportion to the degree of gaseous pressure within the compartment 194 which pressure progressively decreases so long as the valve remains open. It follows therefore that as the synchronizer is functioning it will be necessary, if it is desired to progressively increase the load exerted by the piston 66, to progressively increase the force exerted by the driver upon the selector lever 164 to maintain the valve open; for it will be noted, from an inspection of Figure 2, that in order to prevent the idler levers 128 and 130 from rotating clockwise and thereby lapping the valve, it is necessary that the force exerted by the crank 90 upon said levers through the intermediary of the pin 112 be progressively increased as the force exerted by the piston 66 is progressively increased.

Figure 5:
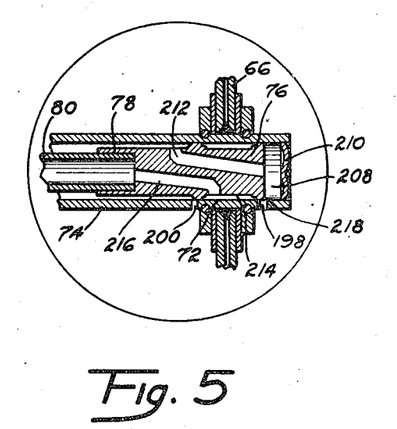
Figure 5 is a view, similar to Figure 4, disclosing the parts of the motor controlling valve means in their transmission neutral position.

If, before the operation of the synchronizer is initiated the driver wishes to stop the movement of the rods 60 and 62 the driver has merely to stop the movement of the selector lever 164. If this is done there follows what is known as the above referred to follow-up-to-lap operation of the valve mechanism. The valve parts then assume the positions disclosed in Figure 5, the valve member 72 continuing to move until the port 198 is covered by a land 218 of the valve member 76. The system is then in a state of equilibrium inasmuch as the connection between the motor compartment 194 and the source of vacuum is cut off. When the selector lever 164 is again moved to complete the operation of placing the transmissions in first gear, the valve member 76 is again moved and the valve parts again assume the relative positions disclosed in Figure 6. This recracking of the valve results in the motor 64 being again energized, for when the compartment 194 is again connected with the source of vacuum, air is evacuated from said compartment resulting in a different differential of pressures acting on the piston 66.

There is thus provided a pressure differential operated motor, the position of the piston, except when the synchronizer is functioning, being controlled by the position of the selector lever 164; and this is known in the art as a follow-up control. It is also to be noted that the driver may, should the motor fail, move the shafts 60 and 62 solely by his physical effort. This is accomplished by rotating the crank 90 until the lost motion between said crank and the pin 114 is taken up whereupon further rotation of said crank effects a movement of said pin and the levers 128 and 130 connected thereto. With the mechanism disclosed in Figure 2 and heretofore described the force necessary to operate the selector lever 164 to establish the transmissions in gear is directly proportional to the force exerted by the piston of the motor 64. Reviewing this feature of applicant's invention, it is to be remembered that the idler levers 128 and 130 function as levers of the first class and that the force exerted by these levers to rotate the lever 118 is the sum total of the force exerted by the piston 66 and that exerted by the physical effort of the driver. The length of the lever arms of the levers 128 and 130 may be varied at will to determine the desired ratio of the two forces. Inasmuch as the force exerted by the selector lever 164 is always directly proportional to the force exerted by the piston 66 it follows that the driver is at all times conscious of the degree of force exerted by said piston. This feature of applicant's transmission operating mechanism is known in the art as the feel of said mechanism.

It will be assumed now that the transmissions 28 and 30 are established in first gear whereupon the driver reengages the friction clutches, if the armored car is equipped with such mechanisms, and increases the speed of the engines to effect the desired speed of the vehicle.

Figure 4:
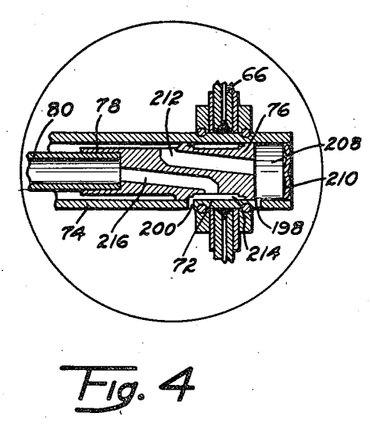
Figure 4 is a sectional view disclosing in detail the motor controlling valve means, the same being operated to effect a shift rail operating movement of the motor piston in one direction.

To establish the transmissions in second gear the selector lever is moved toward its second gear position disclosed in Figure 2 whereby the cross shaft 92 and crank 90 are rotated counterclockwise. The operation of the above described lever means and the valve means 72, 76 connected thereto is just the reverse of previously described operation; accordingly, it is not necessary to describe this second gear operation of the mechanism in detail. Suffice it to say that when the valve is opened the parts 72 and 76 thereof take the positions disclosed in Figure 4 and when the valve is lapped said parts take the positions disclosed in Figure 5. It follows therefore that when the valve is opened the compartment 196 of the motor 64 is partially evacuated and the compartment 194 is vented to the atmosphere; and this results in an energization of the motor to establish the transmissions in second gear. Since the operation of the parts of the mechanism is merely reversed as to the direction of movement it also follows that in establishing the transmissions in second gear there is provided the above described follow up control of the motor 64 and the desired feel whereby the driver is at all times conscious of the degree of force being exerted by said motor.

To establish the transmissions in their third and fourth gear settings the driver, after neutralizing the motor 64 by moving the selector 164 to its transmission neutral position, again effects the above described shift rail selecting operation of the mechanism by moving said selector to the right, Figure 2, into the slot indicated by the numerals 3 and 4. The selector is then moved to either its third or fourth gear position as desired, to operate the transmissions. It will also be apparent that after neutralizing the transmissions the same may be established in their reverse gear settings by moving the selector lever to the position indicated by the reference letter R in Figure 2.

Now in operating the armored car it is ofttimes unnecessary to employ both of the power plants to drive said car; accordingly, either one of said plants may be disabled by operating the manually operated transmission selecting mechanism controlled by the selector lever 188. To disable the power plant of which the transmission 28 is a part the driver moves the lever 188 forwardly to the position indicated by the letters L—ON in Figure 8. This operation serves to tension the cable 181 and draw the key member 178 to the left, Figure 2, out of mesh with the member 126. It will be obvious therefore that subsequent operation of the selector 164 and the power means controlled thereby will have no effect on the members 126, 122 and 142 connected to the shaft 62; that is, no effect to bodily move the shaft 62 to establish the transmission 28 in gear. These operations of the selector merely serve to effect an operation of the shaft 60 to establish the transmission 30 in the desired gear ratio setting.

To disable the power plant of which the transmission 30 is a part the driver moves the selector lever 188 to the position indicated by the letters R—ON in Figure 8. This operation serves to move the key member 178 to the right, Figure 2, out of mesh with the member 124. All subsequent operations of the selector 164 serve merely to operate the shaft 62 to establish the transmission 28 in the desired gear ratio setting; for the force transmitting mechanism is then inoperative to bodily move the shaft 60.

To render the transmission operating mechanism of my invention operative to actuate both transmissions 28 and 30 the selector 188 is moved to the position indicated by the letters R and L, Figure 8. In this position of the selector 188 the key member 178 is meshed with both of the members 124 and 126 thereby making possible the above described simultaneous gear shifting movement of the shafts 60 and 62.

It is desirable to prevent a transmission selecting operation of the lever 188 when either one or both of the transmissions are in gear; accordingly, as an additional feature of my invention, there is provided the plate 190 slotted as disclosed in Figure 2 to receive the rod 192. With this mechanism it is impossible to move the key member 178 until both transmissions are in their neutral position; for in this position the rod 192, which is secured to the member 178, is free to be reciprocated in a slot in the plate 190 indicated by the reference numeral 200; and when either or both of the transmissions are established in gear then the rod 192 is positioned in one of the longitudinally extending slots of said plate.

There is thus provided in the mechanism constituting my invention a simple and compact manual and power operated mechanism serving to operate either one or the other or both of two selective gear transmissions of a self-propelled vehicle.

While one illustrative embodiment has been described, it is not my intention to limit the scope of the invention to that particular embodiment, or otherwise than by the terms of the appended claims.

I claim:

1. In a self-propelled vehicle having a plurality of change-speed transmissions each including a plurality of shift rails, mechanism for operating one or the other or both of said transmissions comprising a pressure differential operated motor, two separate manually operated selector levers and force transmitting means interconnecting the selector levers, motor and transmissions, said force transmitting means being operable, with a certain operation of the selector levers, to effect first a transmission selecting operation of the mechanism, to then effect a shift rail selecting operation of said mechanism and lastly to effect a gear establishing operation of said mechanism.

2. In a self-propelled vehicle having a plurality of change-speed transmissions each including a plurality of shift rails, mechanism for operating one or the other or both of said transmissions comprising a pressure differential operated motor, a two part valve means for controlling the operation of said motor, manually operated selector means including two separate selector levers mounted adjacent the driver's seat and force transmitting means interconnecting the selector levers, the power element of the motor, the two valve parts and the transmissions, said force transmitting means comprising manually operated means including a Bowden control operable to select for operation one or the other or both of said transmissions and further comprising means including a cross shaft and a plurality of force transmitting means mounted on said shaft for effecting a shift rail selecting operation of the mechanism and then effecting a gear establishing operation of said mechanism.

3. In a self-propelled vehicle having a plurality of change-speed transmissions each including a plurality of shift rails, mechanism for operating one or the other or both of said transmissions comprising a pressure differential operated motor, motor controlling valve means, two separate manually operated selector lever members and force transmitting means interconnecting the lever members, motor, valve means and transmissions comprising a Bowden control operated key member constituting part of means operable to select for operation one or the other or both of said transmissions and further comprising means including a plurality of bodily and angularly movable force transmitting members for effecting a shift rail selecting operation of the mechanism and then effecting gear establishing operation of said mechanism.

4. In a self-propelled vehicle having a plurality of change-speed transmissions each including a plurality of shift rails, mechanism for operating one or the other or both of said transmissions comprising two parallel bodily movable and rotatable shafts, a pressure differential operated motor, a valve for controlling the operation of the motor, manually operated selector means including two separate selector levers mounted adjacent the driver's seat and force transmitting means interconnecting the selector levers, motor, valve and transmissions comprising manually operated means including a Bowden control operable to select for operation one or the other or both of said transmissions and means including a cross shaft and a plurality of force transmitting means mounted on said shaft for effecting a shift rail selecting operation of the mechanism by bodily moving the cross shaft and force transmitting means mounted thereon to thereby impart a rotation of said first mentioned shafts and then effecting a gear establishing operation of said mechanism by imparting, by virtue of the operation of said cross shaft, force transmitting means mounted thereon and the aforementioned pressure differential operated motor, a bodily movement of one or the other or both of said first mentioned shafts.

5. In a self-propelled vehicle provided with two change-speed transmissions having shift rails, means for operating one or the other or both of said transmissions comprising two bodily movable and rotatable transmission operating shafts extending parallel to each other and spaced apart, and means for bodily moving one or the other or both of said shafts to effect a meshing of gears and for rotating the shaft to be operated to effect a shift rail selecting operation, said means comprising a pressure differential operated motor, valve means for controlling the operation of said motor, two manually operated selector levers, one operable to effect a transmission selecting operation of the transmission operating means and the other operable to effect a shift rail selecting and gear establishing operation of said means and force transmitting means interconnecting the power element of said motor, the valve means, the transmission operating shafts and the selector levers, said force transmitting means comprising a bodily movable cross shaft and further comprising means mounted upon said cross shaft.

6. In a self-propelled vehicle provided with two change-speed transmissions including shift rails, means for operating one or the other or both of said transmissions comprising two bodily movable and rotatable transmission operating shafts extending parallel to each other lengthwise of the vehicle and spaced apart, and means for bodily moving one or the other or both of said shafts to effect a meshing of gears and for rotating the shaft to be operated to effect a shift rail selecting operation, said means comprising a pressure differential operated motor, valve means for controlling the operation of said motor, manually operated selector means comprising two separate levers mounted within easy reach of the driver and force transmitting means interconnecting the selector levers, the transmission operating shafts, the valve means and the power element of the motor, said force transmitting means including means interconnecting one of the selector levers, a part of the valve means and the transmission operating shafts and further including means interconnecting the power element of the motor, a part of the valve means, and the transmission operating shafts.

7. In a self-propelled vehicle provided with two change-speed transmissions including shift rails, means for operating one or the other or both of said transmissions comprising two bodily movable and rotatable transmission operating shafts extending parallel to each other and spaced apart, and means for bodily moving one or the other or both of said shafts to effect a meshing of gears and for rotating the shaft to be operated to effect a shift rail selecting operation, said means comprising a pressure differential operated motor, a two part valve for controlling the operation of said motor, manually operated selector levers, one operable to effect a transmission selecting operation of the transmission operating means and the other operable to effect a shift rail selecting and gear establishing operation of said means and force transmitting means interconnecting the power element of said motor, the valve means, the transmission operating shafts and the selector levers, said force transmitting means comprising a bodily movable cross shaft and further comprising force transmitting means mounted upon said cross shaft, said latter force transmitting means including a U-shaped lever member rotatably mounted on said cross shaft, means interconnecting said lever member with one or the other or both of said transmission operating shafts and a plurality of lever members and a crank positioned within the U-shaped lever member, said crank being directly connected to one part of the aforementioned valve means.

8. In a self-propelled vehicle provided with two change-speed transmissions having shift rails, means for operating one or the other or both of said transmissions comprising two bodily movable and rotatable transmission operating shafts extending parallel to each other and spaced apart, and means for bodily moving one or the other or both of said shafts to effect a meshing of gears and for rotating the shaft to be operated to effect a shift rail selecting operation, said means comprising a pressure differential operated motor including a two part valve means for controlling the operation of said motor, two manually operated selector levers, one operable to effect a transmission selecting operation of the transmission operating means and the other operable to effect a shift rail selecting and gear establishing operation of said means and force transmitting means interconnecting the power element of said motor, the valve means, the transmission operating shafts and the selector levers, said force transmitting means comprising a bodily movable cross shaft and further comprising means mounted upon said cross shaft said latter means including a U-shaped lever member rotatably mounted on said shaft, means for interconnecting said lever member with one or the other or both of said transmission operating shafts and a plurality of lever members and a crank positioned within the U-shaped lever member said crank being fixedly connected at one of its ends to the cross shaft and connected at its other end to one part of the valve means.

9. In a self-propelled vehicle provided with two change speed transmissions having shift rails, means for operating one or the other or both of said transmissions comprising a plurality of selector levers mounted adjacent the driver's seat of the vehicle, a pressure differential operated motor, valve means for controlling the operation of the motor, two bodily movable and rotatable transmission operating shafts one connected with each transmission and force transmitting means interconnecting the power element of said motor, the valve means, the selector levers and said shafts, said force transmitting means including a bodily movable cross shaft, a crank secured to said shaft, a two-armed lever member rotatably mounted on said shaft, means interconnecting said crank, lever member, valve means and power element of the motor, means for interconnecting said lever member with the transmission operating shafts, means interconnecting one of said selector levers with the cross shaft and means interconnecting the other of said selector levers with the lever member.

10. In a self-propelled vehicle provided with two change speed transmissions having shift rails, means for operating one or the other or both of said transmissions comprising a plurality of selector levers mounted adjacent the driver's seat, a pressure differential operated motor, valve means for controlling the operation thereof, two bodily movable and rotatable transmission operating shafts one connected with each transmission and force transmitting means interconnecting the power element of said motor, the valve means, the selector levers and said shafts, said force transmitting means including a bodily movable cross shaft, a cluster of lever members mounted on said shaft and means interconnecting one of said cluster of levers with the transmission operating shafts said means comprising two members sleeved over said cross shaft, one of said latter members being positioned on one side of the cluster of levers and the other of said members being positioned on the other side of the cluster of levers.

11. In a self-propelled vehicle provided with two change speed transmissions having shift rails, means for operating one or the other or both of said transmissions comprising a plurality of selector levers mounted adjacent the driver's seat, a pressure differential operated motor, valve means for controlling the operation thereof, two bodily movable and rotatable transmission operating shafts one connected with each transmission and force transmitting means interconnecting the power element of said motor, the valve means, the selector levers and said shafts, said force transmitting means including a bodily movable cross shaft, a cluster of lever members mounted on said shaft and means interconnecting one of said cluster of levers with the transmission operating shafts said means comprising two members sleeved over said cross shaft, one of said latter members being positioned on one side of the cluster of levers and the other of said members being positioned on the other side of the cluster of levers and further comprising a key member slidably mounted in the last mentioned lever member.

12. In a self-propelled vehicle provided with two change speed transmissions having shift rails, means for operating one or the other or both of said transmissions comprising a plurality of selector levers mounted adjacent the driver's seat of the vehicle, a pressure differential operated motor, valve means for controlling the operation thereof, two bodily movable and rotatable transmission operating shafts one connected with each transmission and force transmitting means interconnecting the power element of said motor, the valve means, the selector levers and said shafts, said force transmitting means including a bodily movable cross shaft, means interconnecting said shaft and one of the selector levers including a hollow shaft having crank means on one end thereof, means mounted on said cross shaft for imparting both a shift rail selecting and gear establishing operation of one or the other or both of the transmission operating shafts said latter means including a power and manually operated U-shaped lever member having two arms each pivotally mounted on the cross shaft, means for interconnecting said arms with the transmission operating shafts comprising members sleeved over and rotatably mounted on the cross shaft and further comprising a key member which member also serves as means for selecting the operation of one or the other or both of the change-speed transmissions.

HENRY BAADE.

REFERENCES CITED

The following references are of record in the file of this patent:

UNITED STATES PATENTS

| Number | Name | Date |
|---|---|---|
| 1,502,240 | Ford | July 22, 1924 |
| 1,742,749 | Bock | Jan. 7, 1930 |
| 1,880,126 | Fageol | Sept. 27, 1943 |
| 2,026,827 | Dillon | Jan. 7, 1936 |
| 2,132,450 | Wolf | Oct. 11, 1938 |
| 2,152,914 | Price et al. | Apr. 4, 1939 |
| 2,161,153 | Gallun et al. | June 6, 1939 |
| 2,212,955 | Price et al. | Aug. 27, 1940 |
| 2,245,714 | Price et al. | June 17, 1941 |
| 2,267,066 | Wolf | Dec. 23, 1941 |
| 2,277,913 | Kesling | Mar. 31, 1942 |
| 2,289,655 | Kesling | July 14, 1942 |
| 2,292,910 | Thornton | Aug. 11, 1942 |
| 2,305,927 | Kummich | Dec. 22, 1942 |
| 2,324,542 | Schon | July 20, 1943 |

Certificate of Correction

Patent No. 2,426,722. September 2, 1947.

HENRY BAADE

It is hereby certified that errors appear in the printed specification of the above numbered patent requiring correction as follows:

Column 4, line 25, for the word "force" read *effort*; line 26, for "effort" read *force*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*